Sept. 25, 1951 G. A. HIGHBERG ET AL 2,569,433
ELECTRIC SURFACE GAUGE
Filed June 14, 1945 2 Sheets-Sheet 1
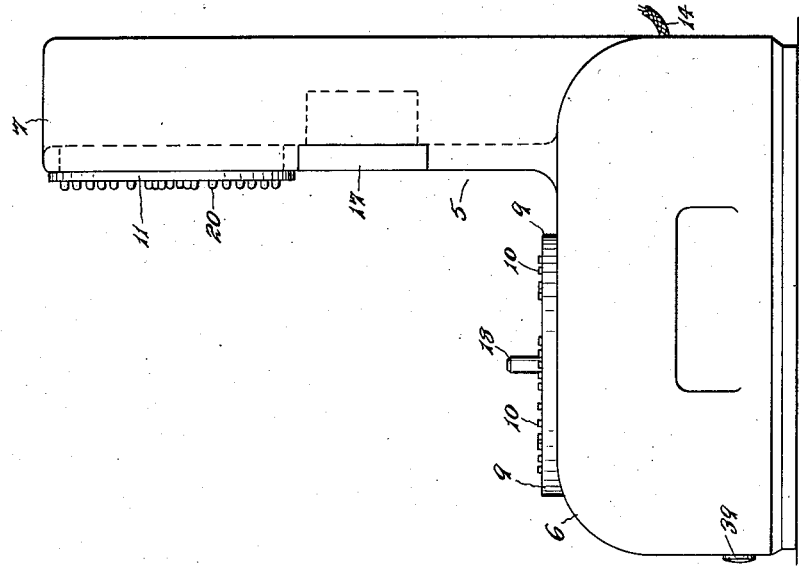
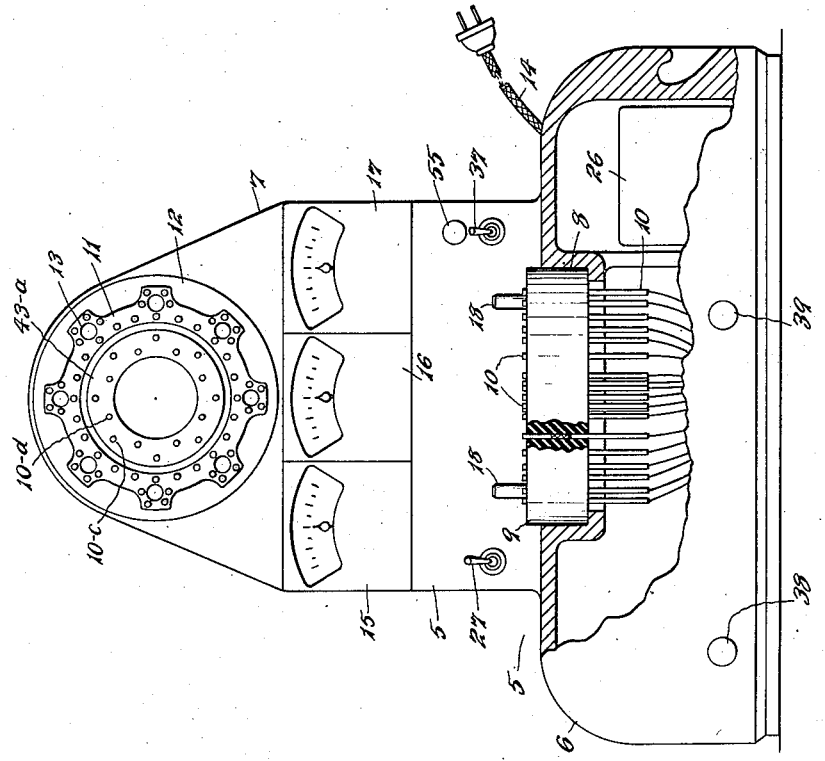
INVENTORS.
GEORGE A. HIGHBERG.
BY HARRY J. HAUCK.
Louis V. Lucia
ATTORNEY Sept. 25, 1951   G. A. HIGHBERG ET AL   2,569,433
ELECTRIC SURFACE GAUGE
Filed June 14, 1945   2 Sheets-Sheet 2
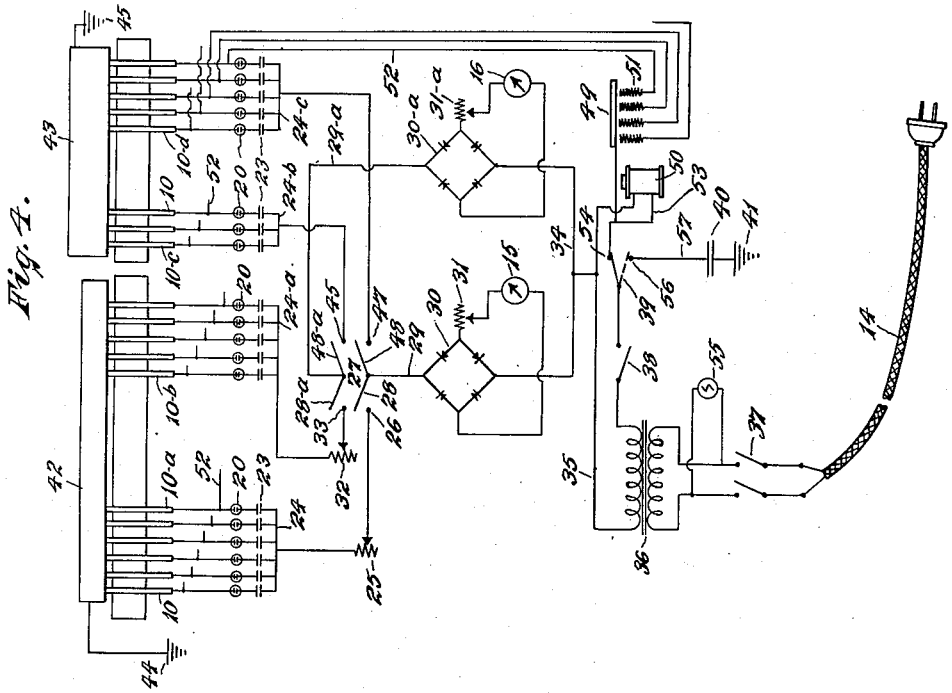
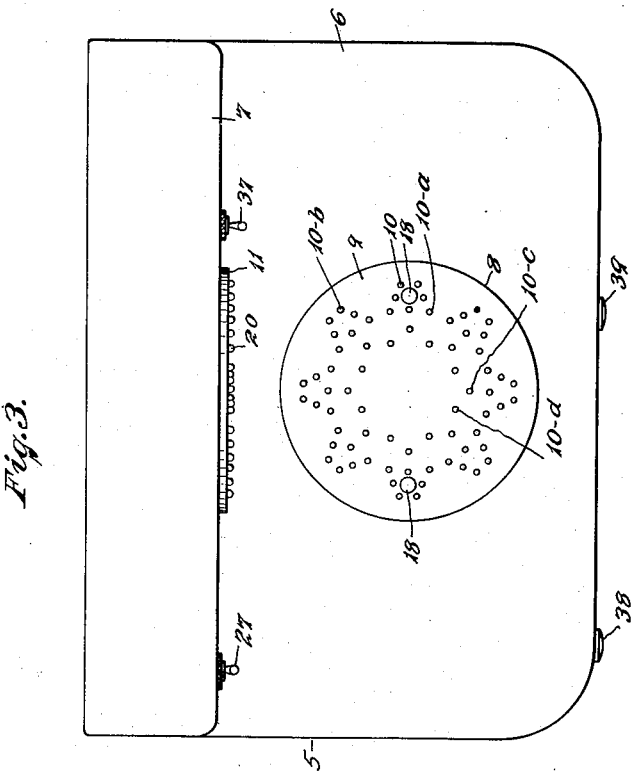
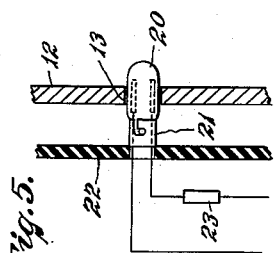
INVENTORS.
GEORGE A. HIGHBERG.
BY HARRY J. HAUCK.
Louis V. Lucia
ATTORNEY.

Patented Sept. 25, 1951

2,569,433

UNITED STATES PATENT OFFICE 2,569,433

ELECTRIC SURFACE GAUGE

George A. Highberg, West Hartford, and Harry J. Hauck, New Britain, Conn., assignors to Modern Tools, Incorporated, a corporation of Connecticut Application June 14, 1945, Serial No. 599,374

1 Claim. (Cl. 33—174)

This invention relates to electric surface gages and more particularly to devices for gaging surfaces on parts of very high precision.

An object of this invention is to provide a surface, or flatness, gage having means for indicating inaccurate surface portions of a part being gaged.

A further object is to provide such a gage for indicating the percentage of accuracy in the surface of the part.

A still further object is to provide a device for gaging a pre-determined number of locations, or spots, on the surface being gaged and also for indicating which of said spots are accurate or inaccurate.

Further objects and advantages of this invention will be more clearly understood from the following description and from the accompanying drawing in which:

Fig. 1 is a front view, partly in section, of an electric gage embodying our invention.

Fig. 2 is a side view thereof in elevation.

Fig. 3 is a plan view of the same in elevation.

Fig. 4 is a diagrammatic view of an electric circuit used in our improved gage.

Fig. 5 is a detail view illustrating the manner in which the indicating bulbs in said circuit may be mounted.

As illustrated in the drawings, our improved electric gage may comprise a casing 5 having a base portion 6 and an upright portion 7.

The said base portion may be provided with a recess 8 in which is mounted a gaging block 9. This block is preferably formed of molded insulating material having the desired qualities to provide a block that is stable in its dimensions as well as durable and strong.

A desired number of contact bars, or pins, 10 are mounted in said block, preferably by molding them therein, and the tops of said pins project slightly above the surface of the block 9 and are accurately finished on a single plane, as shown, for gaging a flat surface, or may be finished to a desired contour for gaging an irregular surface. These contact pins are located in the block 9 in accordance with the particular shape of the part and the surface thereof which is to be gaged and also in accordance with the particular portions of said surface of which it is desired to indicate the accuracy.

A pattern 11 is mounted upon the upright portion 7 and is preferably shown upon a board 12 having a plurality of openings 13 therethrough; each of said openings corresponding with one of the contact pins 10 in the block 9.

Our improved gage is also provided with a desired number of quantitative indicating meters such as the micro-ammeters 15, 16 and 17 which are preferably mounted in the upright portion 7.

The base 6 of the gage may be provided with suitable compartments therein to contain the various units, such as transformers, resistances, condensers and the like, which are included in the electrical circuit, and to thereby provide a compact unit in which the entire electrical circuit with its component parts is so contained that it may be installed for operation by simply connecting an electric cord 14 therefrom to a suitable source of electric current.

The gage block 9, shown in the accompanying drawings, is designed particularly for gaging a piece of work, or part, of the shape shown on the pattern 11. Since such a part is provided with openings 19, the block 9 is provided with dowel pins 18—18 which may extend through opposite openings 19 for locating the part upon the ends of the gage pins 10, so that all locations on the surface of the part being gaged will be located in the same position as the corresponding location on the pattern 11; the said locations being shown in the pattern by light-bulbs 20 which are mounted within a socket 21 upon a panel 22 and project through the board 12. One of these bulbs extends through each of the openings 13 and each bulb is electrically connected to the contact pin 10 which contacts the spot, on the surface being gaged, that corresponds with the spot on the pattern 11 on which the bulb is located.

As shown in Fig. 4 of the drawings, the electric circuit, preferably used in the improved gage above described, may be constructed as follows:

The contact pins 10 may be connected in different groups within the circuit, as indicated at 10—a and 10—b, so that different spots on the surface being gaged may be tested jointly. Each of the said contact pins in each group is connected in series with a light bulb 20 and a condenser 23 to a common conductor 24, 24—a, 24—b or 24—c. The common conductor 24, for the group 10—a, is connected to a variable resistance 25 that is connected to the pole 26 of a double-pole double-throw switch 27. When the said switch is closed, the circuit will extend through a bar 28, in the switch, and a conductor 29 to a rectifier 30 having a potentiometer, or variable resistance, 31 connected to the indicating meter 15. This rectifier is required in order to change A. C. current to D. C. and thereby permit micro-ammeter readings on the said meter.

In the same manner, the group 10—b of contact pins is connected, through the common conductor 24—a and the variable resistance 32, to the pole 33 of the switch. Therefore, when the switch is closed, the circuit will extend through the switch bar 28—a and the conductor 29—a to the rectifier 30—a and the indicating ammeter 16.

Each of the said rectifiers 30 and 30—a are connected, through a common conductor 34, to the conductor 35 leading to one side of the secondary of an A. C. constant-voltage transformer 36 which in turn has the primary connected to a double-pole switch 37 extending to the flexible cord 14 for connection to a source of electric current. The other side of the secondary of said transformer 36 may be connected, through a single-throw pushbutton switch 38, to a double-throw pushbutton switch 39 and a condenser 40, to a ground connection 41 to complete the electrical circuit through either of the parts 42 or 43, whichever is being tested in the gage, and which are also grounded at 44 and 45.

Our improved gage, as shown, is designed especially for a particular part, such as shown on the pattern 11, and for gaging the flatness of a surface on said part at certain portions or spots in said surface; however, a second set of contact pins 10, in groups such as indicated at 10—c and 10—d, may be incorporated in the same gage for gaging a part, indicated at 43, of a somewhat different shape than the part 42. Each of the contact pins in the group 10—c is connected in series with a light bulb, indicated at 20, and a condenser 23 to the common conductor 24—d leading to the pole 46 of the double-pole double-throw switch 27. Each of the pins in the group 10—d are each connected in series with a light bulb 20 and a condenser 23 to the common conductor 24—c leading to the pole 47 of the said switch.

It will be understood that when the bars 28 and 28—a of the double-pole double-throw switch are in closed circuit position, the group 10—a of the contact pins will be connected to the ammeter 15 and the group 10—b will be connected to the ammeter 16, while the switch bars 48 and 48—a will be in open circuit position. When the said bars 48 and 48—a are in closed circuit position, the group 10—c of the contact pins will be connected to the ammeter 16 and the group 10—d will be connected to the ammeter 15, while the bars 28 and 28—a will be in open circuit position. It will therefore be understood that, by means of the double-pole double-throw switch which we have provided, the circuit in our improved electric gage may be selectively operated for gaging with a desired set of groups of contact pins.

In order to permit checking of the circuit for determining whether or not it is in proper working order before a gaging operation, we provide a suitable multi-contact relay having a switch bar 49, which is operated by a magnet 50, and a series of resilient contacts 51, one of which is directly connected through one of the conductors 52 to each of the contact pins 10.

The said magnet 50 is connected to one side of the transformer 36 through the conductor 53 and the switches 39 and 38, and to the other side of said transformer through the conductor 35. A direct circuit is therefore provided between the transformer and the relay magnet 50. The pushbutton switch 39 is normally closed to the pole 54 that is connected to the conductor 53 so that the relay will be actuated simply by the closing of the switch 38.

The operation of our improved electric surface, or flatness, gage is as follows: The supply cord 14 is connected to a source of current and the switch 37 is closed. This will be indicated on the pilot light 55. Then the pushbutton 38 is first closed in order to check the condition of the electric circuit and of all the component parts thereof. This will close the circuit from the transformer through said switch 38, the switch 39 and the conductor 53 to the magnet 50 and therefrom through the conductor 35 to the other side of the transformer 36. This will energize the magnet 50 and draw the bar 49 downwardly against each of the resilient contacts 51. Each circuit will then continue through each of the conductors 52 directly to each of the contact pins 10. From there, the circuit will return through the bulbs 20, the condensers 23, the double-pole double-throw switch 27, the rectifiers 30 and 30—a, the ammeters 15 and 16, the common conductor 34 and the conductor 35, to the other side of the transformer 36. Thus it will be seen that, by simply closing the switch 38, the bulbs on the pattern will ignite and thereby indicate the condition of the circuit for each of the contact pins 10 in a set of groups, depending upon the position of the double-pole double-throw switch.

After it has been determined that the entire circuit is in proper condition, the double-pole double-throw switch 27 is placed in position for whichever work part, 42 or 43, that is to be gaged. One of the said parts is then placed in proper position on the gage block 9 and upon the surface formed by the combined ends of the contact pins 10. The said part is then grounded by connecting it in any suitable manner, as at 44 and 45. The pushbutton switch 39 is then moved into contact with the pole 56, with one hand, and the switch 38 is closed with the other hand. This occupies both hands of the operator and thereby prevents danger of interference with the gaging operation.

At this time, the circuit is closed through the switches 38 and 39, the pole 56, the conductor 57, and the condenser 40 to the ground connection 41. The other side of the circuit then continues through the connections 44 or 45, and the respective work part 42 or 43, depending upon which part is being tested, the pins 10, the bulbs 20, the condensers 23, the double-pole double-throw switch 27, the ammeters 15 and 16, the common conductor 34, and the conductor 35, to the other side of the transformer 36. This will light the bulbs 20 and thereby indicate where the proper contact is made between the contact pins and the surface being gaged. Wherever an error, or low spot, in the surface of the work part does not permit contact with a contact pin 10, the corresponding bulb on the pattern 11 will not be lighted and this will show the number and location of the spots on the surface which are inaccurate.

For the part shown in the pattern 11, the group of contact pins 10—b includes all of the pins in the outer annular row and the group 10—a includes all of the pins located around each of the holes 19 in the work piece. When the groups 10—c and 10—d are provided for the different work part 43, these groups may also be located as desired and, as indicated in the drawings, may be shown in a separate pattern 43—a. Therefore, a glance at the indicating ammeters will show the percentage of current passing through each group of contacts and each will indicate the percentage of accuracy for each group of spots on the surface being gaged.

At each operation, the total amount of current passing through the circuit will depend upon the number of contacts made between the contact pins 10 and the surface of the work part being gaged. For each of such contacts that is made, there will be an additional amount of current, passing through the ammeters, which is equal to that which can pass through the A. C. resistance of condenser 23 and the light bulb 20. Therefore, the total amount of current passing through the circuit will depend wholly upon the total number of bulbs 20 and condensers 23 through which the current will be permitted to flow by reason of the contacts between their corresponding contact pins and the surface being gaged. The total current passing through a group of contact pins will then be shown upon the corresponding indicating meter 15 or 16 and this will indicate the amount of current passing through the meters in terms of the percentage of accuracy in the work surface.

It is to be understood that, in gaging the surfaces of work parts which are of very high precision, and naturally very costly, it is of the utmost importance that the said surface should not be marred by arcing between the contact pins 10 and the surface of the work. For this reason, we have provided the light bulbs 20, the condensers 23, and the transformer 35 to reduce the voltage to a minimum amount so that no appreciable arcing will take place between the contact pins 10 and the surface being gaged. Also, in order that no current may pass across the gaps where the pins 10 do not actually contact the surface being gaged, we have provided, for the light bulbs 20, what are known as neon, or gas, bulbs in which, when energized, the gas will become ionized and thus permit the passage of current therethrough and cause the bulb to glow. When not energized, these bulbs will present an extremely high amount of resistance which, for all practical purposes can be considered as infinite, due to the fact that there is a substantial gap between the electrodes therein, and thus entirely prevent the passage of any current across the gap at the pins 10 which are not in contact with the work and insure that the total amount of current shown upon the ammeters 15 and 16 is only the current which is passing through actual contact between the contact pins and the surface of the work part so that an accurate reading may be obtained to indicate the percentage of accuracy on the surface being gaged.

It is also pointed out that the indicating ammeters 15 and 16 may be calibrated for the groups 10—c and 10—d of contact pins by means of the variable resistances, or potentiometers, 31 and 31—a. The said ammeters may also be calibrated for the groups 10—a and 10—b of contact pins by adjustment of the variable resistances 25 and 32. When an ammeter is to be calibrated, the circuit is closed directly through the relay bar 49 and the conductors 52 to the contact pins, as above described, so that one hundred per cent of the current will pass through each of the indicating ammeters 15 and 16, and the said ammeters are then adjusted to indicate one hundred per cent.

After the ammeters have been so calibrated, when the circuit is closed through the work being checked, the amount of current flow indicated on the said ammeters will be the percentage, or the amount of current which is flowing through the contacts being made between the contact pins and the surface being checked and therefore it may be readily determined whether or not the accuracy of the surface is within a prescribed limit.

From the above, it will be clearly understood that we have provided a novel and efficient electric surface gage, or flatness gage, having a circuit for gaging surfaces of high precision, to determine the percentage of accuracy in said surfaces and the location of any inaccuracies by means of lights and indicating meters, and also having means in said circuit to provide a practically infinite amount of resistance for completely eliminating flow of current across even a very short gap, between the contact pins and the surface being checked, where actual contact is not made, so as to thereby eliminate damage to said surface by arcing at such points.

It is also to be understood that our invention may be used for gaging work of different shapes, and surfaces other than flat, since the ends of the contacts 10 may be finished to accommodate any special contour of a surface on a work part that is to be gaged.

We claim:

An electric gage for gaging the surface of a work part; said gage comprising an electric circuit having therein a plurality of contact members adapted to engage the surface being gaged; said contact members being insulated from each other and supported with their ends disposed substantially on a single plane and in position to engage the surface being gaged; the said contact members also being connected in said circuit in parallel and having a light bulb and a condenser in series with each of said contact members, certain ones of said contact members being connected in parallel and by a single conductor in said circuit to an ammeter for indicating the amount of current flowing through each of said groups, and means for selectively connecting said ammeter with different groups of said contact members; the work part being mounted upon the ends of said contact members and grounded to said circuit to permit the flow of current therethrough for lighting said indicating bulbs to show where actual contact exists between a contact member and the surface being checked, and means in said circuit selectively operatable for by-passing said grounded work part and completing the circuit independently of the work part.

GEORGE A. HIGHBERG.
HARRY J. HAUCK.

REFERENCES CITED

The following references are of record in the file of this patent:

UNITED STATES PATENTS

| Number | Name | Date |
|---|---|---|
| 1,257,873 | Johnson | Feb. 26, 1928 |
| 1,689,227 | Burrell | Oct. 30, 1928 |
| 1,766,991 | Gardner | June 24, 1930 |
| 1,907,402 | Fedor | May 2, 1933 |
| 1,936,828 | Clement | Nov. 28, 1933 |
| 2,232,360 | Barnett | Feb. 18, 1941 |
| 2,286,014 | Rowe | June 9, 1942 |
| 2,383,550 | Homan | Aug. 28, 1945 |
| 2,438,453 | Powell | Mar. 23, 1948 |
| 2,493,524 | Bruns | Jan. 3, 1950 |

FOREIGN PATENTS

| Number | Country | Date |
|---|---|---|
| 23,439 | Great Britain | Dec. 6, 1895 |
| 544,695 | Great Britain | Apr. 23, 1942 |
| 654,908 | Germany | Jan. 4, 1938 |